(12) United States Patent
Delaloye et al.

(10) Patent No.: US 8,185,260 B2
(45) Date of Patent: May 22, 2012

(54) PROGNOSTIC AND HEALTH MANAGEMENT ACCURACY MAINTENANCE SYSTEM AND METHOD

(75) Inventors: James Delaloye, Mesa, AZ (US); David A. Payne, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 642 days.

(21) Appl. No.: 12/370,371

(22) Filed: Feb. 12, 2009

(65) Prior Publication Data

US 2010/0204852 A1      Aug. 12, 2010

(51) Int. Cl.
*G05D 1/08*      (2006.01)

(52) U.S. Cl. .......... 701/4; 417/110; 700/282; 184/6.24; 184/7.4

(58) Field of Classification Search ...... 701/4; 417/110; 165/41; 62/7; 508/112; 72/42; 700/282; 184/6.24, 7.4
See application file for complete search history.

(56) References Cited

U.S. PATENT DOCUMENTS

| | | | |
|---|---|---|---|
| 3,856,686 A * | 12/1974 | Sato et al. ..................... | 508/112 |
| 6,364,602 B1 | 4/2002 | Andrew et al. | |
| 6,823,675 B2 | 11/2004 | Brunell et al. | |
| 6,941,217 B1 | 9/2005 | Munson, Jr. | |
| 6,973,396 B1 | 12/2005 | Shah et al. | |
| 7,043,402 B2 | 5/2006 | Phillips et al. | |
| 7,322,197 B2 | 1/2008 | Kudrna et al. | |
| 7,769,507 B2 * | 8/2010 | Volponi et al. ............... | 701/31.6 |
| 2004/0019393 A1 | 1/2004 | Heider et al. | |
| 2004/0039497 A1 * | 2/2004 | Wood et al. ..................... | 701/4 |
| 2005/0004684 A1 | 1/2005 | Cribbs | |
| 2005/0016176 A1 | 1/2005 | Griffiths et al. | |
| 2006/0047403 A1 | 3/2006 | Volponi et al. | |
| 2007/0055392 A1 | 3/2007 | D'Amato et al. | |
| 2007/0089424 A1 | 4/2007 | Venkataramani et al. | |
| 2007/0118271 A1 | 5/2007 | Wiseman et al. | |
| 2007/0264133 A1 * | 11/2007 | Schwarz et al. ............. | 417/110 |
| 2008/0178600 A1 | 7/2008 | Healy et al. | |

* cited by examiner

*Primary Examiner* — Behrang Badii
(74) *Attorney, Agent, or Firm* — Ingrassia Fisher & Lorenz, P.C.

(57) ABSTRACT

A prognostic and health accuracy maintenance system and method for a system following on-site replacement of a component in the system is provided. A system characterization model of at least portions of the system is generated and embedded within a controller in the system. The system characterization model is adapted to receive a plurality of signals that are each representative of an operational parameter within the system and is responsive to each of the signals to generate simulation response data and determine system health based, at least in part, on the simulation response data. When a component within the system is replaced, a determination is made as to whether the replacement component exhibits one or more operational performance characteristics that differ from the component it replaced. If so, the embedded system characterization model is updated in-situ.

11 Claims, 3 Drawing Sheets

PROGNOSTIC AND HEALTH MANAGEMENT ACCURACY MAINTENANCE SYSTEM AND METHOD

STATEMENT REGARDING FEDERALLY SPONSORED RESEARCH OR DEVELOPMENT

This invention was made with Government support under Contract No. N00019-02-C-3002, awarded by the U.S. Navy. The Government has certain rights in this invention.

TECHNICAL FIELD

The present invention relates to prognostic health management and, more particularly, to a prognostic and health management accuracy maintenance system and method that may be used with various systems.

BACKGROUND

Aircraft gas turbine engines are typically supplied with lubricant from a pump driven lubricant supply system. In particular, the lubrication supply pump, which may be part of an electric motor driven pump assembly having a plurality of pumps on a common shaft, draws lubricant from a lubricant reservoir, and increases the pressure of the lubricant. The lubricant is then delivered, via an appropriate piping circuit, to the engine. The lubricant is directed, via appropriate flow circuits within the engine, to the various engine components that may need lubrication, and is collected in one or more recovery sumps in the engine. One or more of the pump assembly pumps then draws the lubricant that collects in the recovery sumps and returns the lubricant back to the reservoir.

An electric lubrication supply system, such as the one described above, can be an important system in an aircraft depending, for example, on the components to which it is supplying lubricant. Indeed, lubrication supply system reliability can affect overall aircraft operability. As such, it is desirable to monitor and determine the overall health of an aircraft lubrication supply system. In most instances overall system health is determined during an aircraft shutdown period, when the lubrication system is not needed to supply lubricant to one or more components. More specifically, one or more maintenance technicians may run various tests to check system health. These tests, however, may not accurately reflect the overall health of the system, especially during normal system operations with the aircraft in flight, nor may these tests accurately predict health trends of system components or of the overall system.

Hence, there is a need for a system and method that determines the overall health of various systems, including an aircraft lubrication supply system, and that can accurately predict health trends of system components or of the overall system. There is also a need for a system and method that maintains the accuracy of predicted health trends when components within the system are replaced. The present invention addresses at least this need.

BRIEF SUMMARY

The present invention provides a prognostic and health accuracy maintenance system and method. In one embodiment, and by way of example only, a method of maintaining prognostic health management accuracy of a system following on-site replacement of a component in the system includes generating a system characterization model of at least portions of the system. The system characterization model is adapted to receive a plurality of signals that are each representative of an operational parameter within the system and is responsive to each of the signals to generate simulation response data and determine system health based, at least in part, on the simulation response data. The system characterization model is embedded into a controller within the system. A component within the system is replaced with a replacement component, and a determination is made as to whether the replacement component exhibits one or more operational performance characteristics that differ from the component it replaced. The embedded system characterization model is updated in-situ if it is determined that the replacement component exhibits one or more operational performance characteristics that differ from the component it replaced.

In another exemplary embodiment, a method of maintaining prognostic health management accuracy of an aircraft lubrication supply system following on-site replacement of a component in the aircraft lubrication supply system includes generating a system characterization model of at least portions of the aircraft lubrication supply system. The system characterization model is adapted to receive a plurality of signals that are each representative of an operational parameter within the aircraft lubrication supply system and is responsive to each of the signals to generate simulation response data and determine system health based, at least in part, on the simulation response data. The system characterization model is embedded into a lubrication system pump controller. A component within the aircraft lubrication supply system is replaced with a replacement component, and a determination is made as to whether the replacement component exhibits one or more operational performance characteristics that differ from the component it replaced. The embedded system characterization model is updated in-situ if it is determined that the replacement component exhibits one or more operational performance characteristics that differ from the component it replaced.

In yet a further exemplary embodiment, an aircraft lubrication supply system includes a motor, a pump, and a controller. The motor is operable, upon being energized from a power source, to rotate and supply a drive force. The pump is coupled to receive the drive force from the motor and is operable, upon receipt thereof, to supply lubricant. The controller includes an updatable system characterization model, and is coupled to receive a pressure signal representative of lubricant pressure, a temperature signal representative of lubricant temperature, a speed signal representative of motor rotational speed, a motor current signal representative of current being drawn by the motor, a motor voltage signal representative of motor supply voltage, and one or more aircraft condition signals representative of one or more aircraft operating conditions. The controller is operable, in response to each of the received signals, to at least selectively energize the motor from the power source, generate simulation response data using the updatable system characterization model, and determine lubrication supply system health based, at least in part, on the simulation response data. The controller is additionally configured to allow the updatable system characterization model to be updated in-situ to reflect replacement of one or more aircraft lubrication supply system components.

Other independent features and advantages of the preferred prognostic and health accuracy maintenance system and method will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or its application and uses. Furthermore, there is no intention to be bound by any theory presented in the preceding background or the following detailed description. In this regard, although the system and method are depicted and described as being implemented in an aircraft lubrication system for supplying lubricant to a turbomachine, it will be appreciated that the invention is not so limited, and that the system and method described herein may be used to with any one of numerous aircraft systems and numerous other non-aircraft systems.

Figure 1:
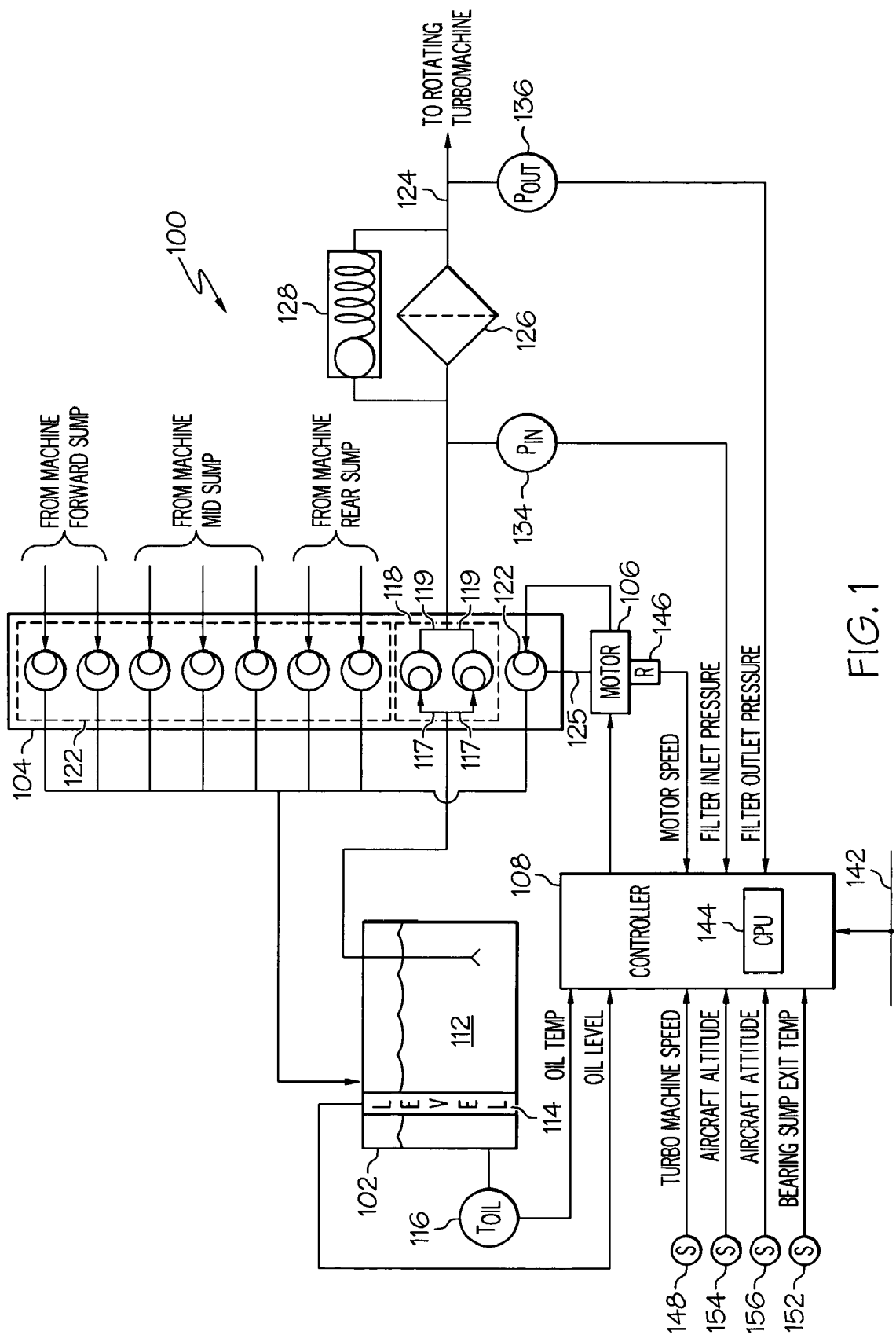
FIG. 1 is a schematic diagram of an aircraft lubrication supply system according to an exemplary embodiment of the present invention.

With reference now to FIG. 1, a schematic diagram of an exemplary aircraft lubrication supply system 100 is depicted, and includes a reservoir 102, a pump assembly 104, a motor 106, and a controller 108. The reservoir 102 is used to store a supply of lubricant 112 such as, for example, oil or other suitable hydraulic fluid. A level sensor 114 and a temperature sensor 116 are installed within, or on, the reservoir 102. The level sensor 114 senses the level of lubricant in the reservoir 102 and supplies a level signal representative of the sensed level to the controller 108. The temperature sensor 116 senses the temperature of the lubricant in the reservoir 102 and supplies a temperature signal representative of the sensed temperature to the controller 108. It will be appreciated that the level sensor 114 and the temperature sensor 116 may be implemented using any one of numerous types of level and temperature sensors, respectively, that are known now or that may be developed in the future.

The pump assembly 104 is configured to draw lubricant from, and return used lubricant to, the reservoir 102. In the depicted embodiment the pump assembly 104 includes a plurality of supply pumps 118 and a plurality of return pumps 122. The supply pumps 118 each include a fluid inlet 117 and a fluid outlet 119. The supply pump fluid inlets 117 are each coupled to the reservoir 102, and the supply pump fluid outlets are each coupled to a lubricant supply conduit 124. The supply pumps 118, when driven, draw lubricant 112 from the reservoir 102 into the fluid inlets 117 and discharge the lubricant, at an increased pressure, into the fluid supply conduit 124, via the fluid outlets 119. The lubricant supply conduit 124, among other potential functions, supplies the lubricant to one or more rotating machines. Although one or more various types of machines could be supplied with the lubricant, in the depicted embodiment the lubricant is supplied to a rotating turbomachine. It will be appreciated that each of the pumps 118, 122 that comprise the pump assembly 104 could be implemented as any one of numerous types of centrifugal or positive displacement type pumps, but in the preferred embodiment each pump 118, 122 is implemented as a positive displacement pump.

As FIG. 1 also depicts, a lubricant filter 126 is disposed within the lubricant supply conduit 124. The lubricant filter 126 removes any particulate or other debris that may be present in lubricant before it is supplied to the turbomachine. A filter bypass valve 128, and appropriate bypass piping 132, are disposed in parallel with the lubricant filter 126. The bypass valve 128 is configured such that it is normally in a closed position, and moves to the open position when a predetermined differential pressure exists across it. Thus, if the lubricant filter 126 becomes clogged and generates a sufficiently high differential pressure, the bypass valve 128 will open to ensure a sufficient flow of lubricant to the turbomachine is maintained.

The lubricant supply conduit 124 also includes a pair of pressure sensors, a filter inlet pressure sensor 134 and a filter outlet pressure sensor 136. The pressure sensors are each operable to sense lubricant pressure and to supply a pressure signal representative of the sensed pressure to the controller 108. As the assigned nomenclature connotes, the filter inlet pressure sensor 134 senses lubricant pressure at the inlet to the lubricant filter 126, and the filter outlet pressure sensor 136 senses lubricant pressure at the outlet of the lubricant filter 126. It will be appreciated that the depicted configuration is merely exemplary of a particular preferred embodiment, and that the system 100 could be implemented with more or less than this number of pressure sensors. For example, the system 100 could be implemented with only the filter inlet pressure sensor 134 or only the filter outlet pressure sensor 136, with a plurality of filter inlet pressures sensors 134 and filter outlet pressure sensors 136, or with one or more differential pressure sensors.

The lubricant that is supplied to the rotating turbomachine flows to various components within the turbomachine and is collected in one or more sumps in the turbomachine. The lubricant that is collected in the turbomachine sumps is then returned to the reservoir 102 for reuse. To do so, a plurality of the return pumps 122 draws used lubricant from the turbomachine sumps and discharges the used lubricant back into the reservoir 102 for reuse. Before proceeding further it will be appreciated that the configuration of the pump assembly 104 described herein is merely exemplary, and that the pump assembly 104 could be implemented using any one of numerous other configurations. For example, the pump assembly 104 could be implemented with a single supply pump 118 and a single return pump 122, or with just one or more supply pumps 118. No matter how many supply or return pumps 118, 122 are used to implement the pump assembly 104, it is seen that each pump 118, 122 is mounted on a common pump assembly shaft 138 and is driven via a drive force supplied from the motor 106.

The motor 106 is coupled the pump assembly shaft 138 and is operable, upon being energized from a power source 142, to supply a drive force to the pump assembly 104 that drives the pumps 118, 122. In the depicted embodiment the motor 106 is directly coupled to the pump assembly shaft 138. It will be appreciated, however, that the motor 106, if needed or desired, could be coupled to the pump assembly shaft 138 via one or more gear assemblies, which could be configured to either step up or step down the motor speed. It will additionally be appreciated that the motor 106 could be implemented as any one of numerous types of AC or DC motors, but in a particular preferred embodiment the motor 106 is implemented as a brushless DC motor.

The controller 108 is coupled to, and selectively energizes, the motor 106 from the power source 142. The controller 108 preferably implements control logic via, for example, a central processing unit 144 that selectively energizes the motor 106 from the power source 142 to thereby control the rotational speed of the motor 106. It will be appreciated that the control logic implemented by the controller 108 may be any one of numerous control laws. For example, the control logic may implement a closed-loop pressure control law, or a closed-loop speed control law. If the controller 108 implements a closed-loop pressure control law, the system 100 may use one or both of the pressure signals supplied by the filter inlet pressure sensor 134 and the filter outlet pressure sensor 136, or from one or more other non-illustrated pressure sensors. Moreover, if the controller 108 implements a closed-loop speed control law, the system 100 may include one or more rotational speed sensors 146 (only one depicted) to sense motor rotational speed and to supply a rotational speed feedback signal representative of the sensed rotational speed to the controller 108.

It will be appreciated that the controller 108 may additionally receive signals representative of various turbomachine and/or aircraft operational parameters. If so configured, the control logic in the controller 108, based at least in part on these signals, preferably determines an appropriate lubricant supply pressure and/or flow rate and selectively energizes the motor 106 so that it will rotate at least the supply pumps 118 at a speed that will supply lubricant at the appropriate lubricant supply pressure and/or flow rate. Some non-limiting examples of various turbomachine and aircraft operational parameters that may be supplied to the controller 108 are depicted in FIG. 1, and include turbomachine speed, bearing sump exit temperature, and one or more aircraft condition signals, such as aircraft altitude and aircraft attitude. As may be appreciated, one or more suitable sensors may be included to supply these signals. Thus, as FIG. 1 additionally depicts, the system 100 may further include one or more turbomachine speed sensors 148, one or more bearing sump exit temperature sensors 152, one or more aircraft altitude sensors 154, and one or more aircraft attitude sensors 156.

Figure 2:
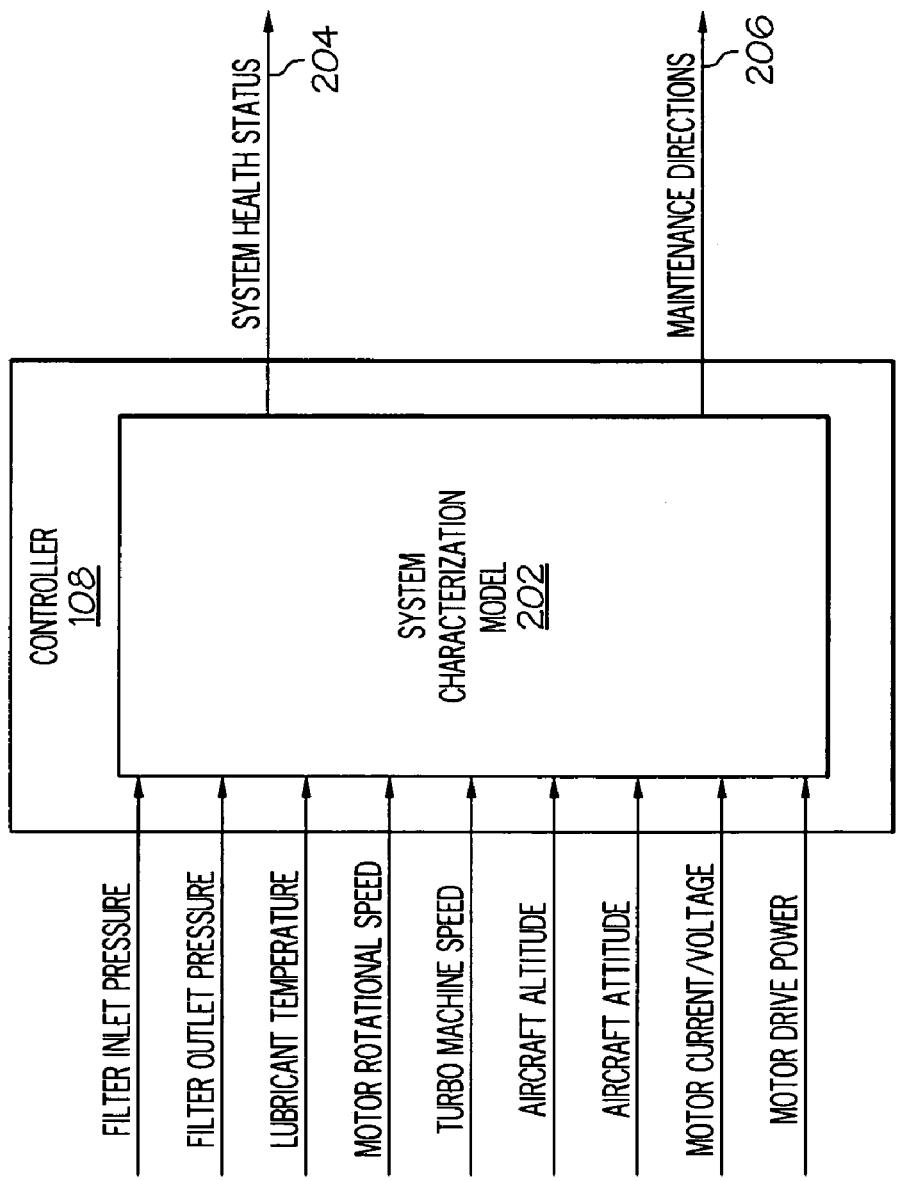
FIG. 2 is a functional block diagram of a portion of an exemplary controller that may be used to implement the system of FIG. 1.

The controller 108, in addition to implementing an appropriate control law, is further configured to provide prognostic and health management for the system 100. More specifically, and with reference now to FIG. 2, it is seen that the controller 108 additionally implements a system characterization model 202, which is used to provide maintenance service direction to an operator. The system characterization model 202 is preferably a software model of at least portions of the lubrication supply system 100, and receives at least a subset of the above-noted signals that are supplied to the controller 108 to implement the control law. The system characterization model 202, in response to these signals, generates simulation response data representative of various ones of these same parameters. For example, the system characterization model 202 may generate simulation response data representative of one or more lubrication pressures within the system, lubrication temperature at one or more points within the system, and motor rotational speed, just to name a few.

The system characterization model 202, based at least in part on the generated simulation response data, determines lubrication supply system health status and generates data 204 representative thereof for use by one or more operators. The system characterization model 202 also generates and supplies, as needed, data representative of operator maintenance directions 206. It will be appreciated that the system characterization model 202 may implement any one of numerous suitable algorithms for determining overall system health and maintenance directions. The system characterization model 202 may, for example, compare the simulation response data to actual system data supplied from one or more of the sensors to determine system health.

It will additionally be appreciated that the specific parameters monitored by the system characterization model 202 may vary. In the depicted embodiment, the system characterization model 202 receives the previously-described filter inlet lubricant pressure signal from the filter inlet pressure sensor 134, the filter outlet lubricant pressure signal from the filter outlet pressure sensor 136, the lubricant temperature signal from the lubricant temperature sensor 116, the speed signal from the rotational speed sensor 146, the turbomachine speed signal from the turbomachine speed sensor 148, the bearing sump exit temperature signal from the bearing sump exit temperature sensors 152, the aircraft altitude signal from the aircraft altitude sensor 154, and the aircraft attitude signal from aircraft attitude sensor 156. The system characterization model 202 may also preferably receive one or more signals representative of current being drawn by the motor 106, and of the voltage supplied to the motor 106.

Figure 3:
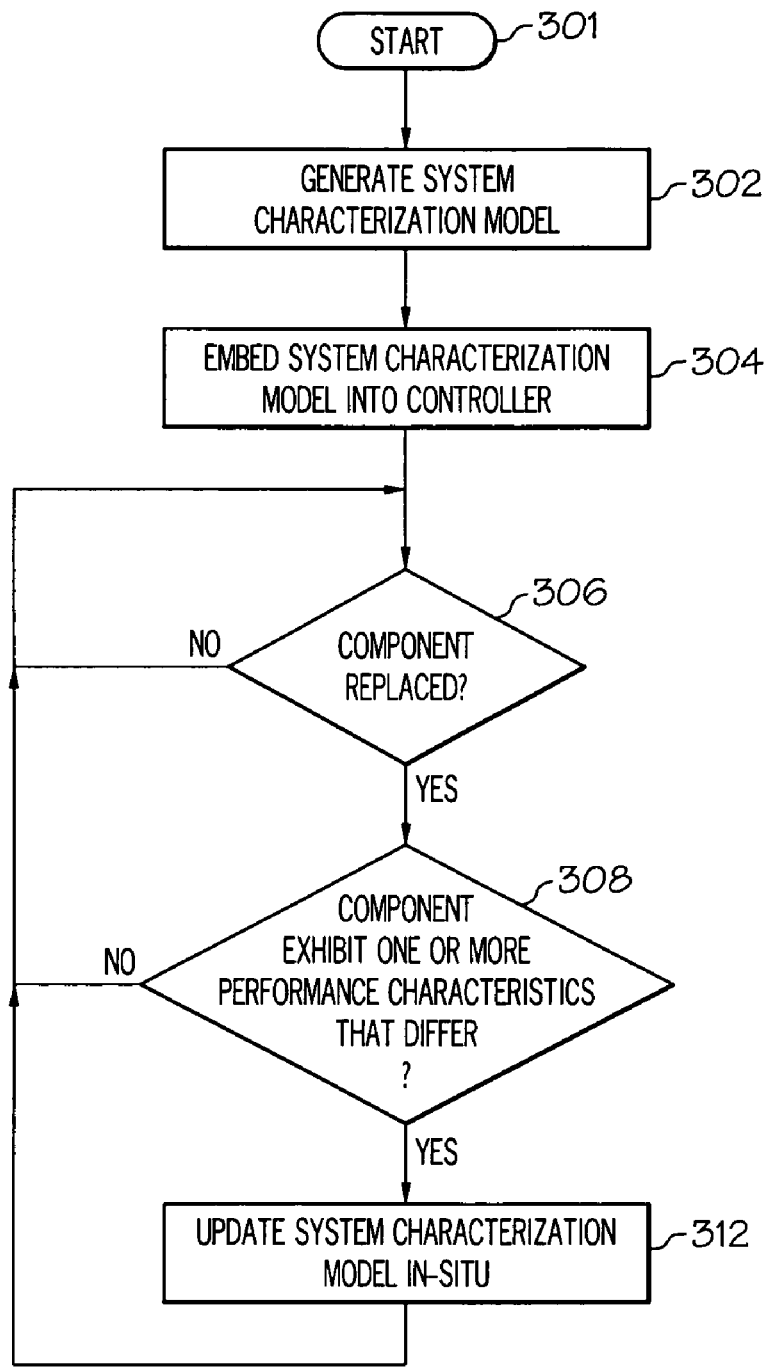
FIG. 3 depicts a flowchart of a method that may be implemented by the system of FIG. 1.

The system characterization model 202 is also preferably implemented as an updatable model. More specifically, the system characterization model 202 may be updated and modified in-situ to reflect in-situ component changes within the system 100. That is, upon replacement of one or more components within the system 100, the controller 108 is preferably configured to allow the system characterization model 202 to be updated in-situ to reflect such replacement. This methodology is depicted, for convenience, in flowchart form in FIG. 3, and with reference thereto will now be described in more detail.

As shown therein, initially the system characterization model 202 of at least portions of the aircraft lubrication supply system 100 is generated (302). The system characterization model 202, as noted above, is embedded into the controller 108 (304). Thereafter, if a component within the aircraft lubrication supply system is replaced (306), a determination is made as to whether the replacement component exhibits one or more operational performance characteristics that differ from the component it replaced (308). If not, then the embedded system characterization model 202 does not need to be updated and the process 300 returns to await another component replacement. If, however, the replacement component does exhibit one or more operational performance characteristics that differ from the component it replaced, the embedded system characterization model 202 is updated in-situ (312).

It will be appreciated that the specific manner in which the system characterization model 202 is updated may vary. For example, suitable pre-installation tests may be conducted on each replacement component to determine if it exhibits one or more operational performance characteristics that differ from the component it is replacing. For each component that does exhibit one or more operational performance characteristics that differ from the component it is replacing, a performance map unique to the replacement component is then generated. Thereafter, or commensurate with component replacement, a user may update the embedded system characterization model in-situ to reflect the performance map unique to the replacement component(s).

Alternatively, the controller 108 could be configured, in response to an appropriate input signal, to automatically run one or more in-situ tests of the system 100 following installation of the replacement component(s) to generate a performance map unique to the replacement component(s). The controller 108 would then automatically update the embedded system characterization model 202 in-situ to reflect the performance map(s) unique to the replacement component(s).

No matter the specific manner in which the system characterization model 202 is updated following component replacement, it will be appreciated that the prognostic health management accuracy of the system 100 is maintained, and indeed may be improved.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An aircraft lubrication supply system, comprising:
    a motor operable, upon being energized from a power source, to rotate and supply a drive force;
    a pump coupled to receive the drive force from the motor and operable, upon receipt thereof, to supply lubricant; and
    a controller including an updatable system characterization model, the controller coupled to receive a pressure signal representative of lubricant pressure, a temperature signal representative of lubricant temperature, a speed signal representative of motor rotational speed, a motor current signal representative of current being drawn by the motor, a motor voltage signal representative of motor supply voltage, and one or more aircraft condition signals representative of one or more aircraft operating conditions, the controller operable, in response to each of the received signals, to (i) at least selectively energize the motor from the power source, (ii) generate simulation response data using the updatable system characterization model, and (iii) determine lubrication supply system health based, at least in part, on the simulation response data,
    wherein the controller is configured to allow the updatable system characterization model to be updated in-situ to reflect replacement of one or more aircraft lubrication supply system components.

2. The system of claims 1, wherein:
    the controller is configured to selectively receive a performance map unique to a component that has been replaced in the aircraft lubrication supply system; and
    the controller is operable, upon receipt of the performance map, to update the updatable system characterization model to include the performance map.

3. The system of claim 1, wherein:
    the controller is configured, upon replacement of one or more aircraft lubrication supply system components, to selectively run one or more in-situ tests of the aircraft lubrication supply system to generate a performance map unique to the one or more aircraft lubrication supply system components that were replaced; and
    automatically updating the embedded system characterization model in-situ to reflect the performance map.

4. The system of claim 1, wherein the controller is further operable, in response to each of the received signals, to at least selectively generate data representative of operator maintenance directions.

5. The system of claim 1, further comprising:
    a lubricant filter having a filter inlet and a filter outlet, the filter inlet coupled to receive at least a portion of the lubricant supplied by the pump, the lubricant filter configured to filter the lubricant received thereby and discharge filtered lubricant via the filter outlet; and
    a filter outlet pressure sensor disposed downstream of the filter outlet, the filter outlet pressure sensor configured to sense filter outlet pressure and supply a filter outlet pressure signal representative thereof to the controller,
    wherein the pressure signal received by the controller is the filter outlet pressure signal.

6. The system of claim 5, further comprising:
    a filter inlet pressure sensor disposed upstream of the filter inlet, the filter inlet pressure sensor configured to sense filter inlet pressure and supply a filter inlet pressure signal representative thereof to the controller,
    wherein the controller is further responsive the filter inlet pressure signal to determine lubrication supply system health status.

7. The system of claim 1, further comprising:
    a rotational speed sensor configured to sense motor rotational speed and supply the speed signal to the controller.

8. The system of claim 1, further comprising:
    a temperature sensor configured to sense lubricant temperature and supply the temperature signal to the controller.

9. The system of claim 1, wherein the one or more aircraft condition signals representative of aircraft operating conditions include:
    an altitude signal representative of aircraft altitude; and
    an attitude signal representative of aircraft attitude.

10. The system of claim 1, further comprising:
    an altitude sensor configured to sense aircraft altitude and supply the altitude signal representative thereof to the controller; and
    an attitude sensor configured to sense aircraft attitude and supply the attitude signal representative thereof to the controller.

11. The system of claim 1, further comprising:
    a bearing sump exit temperature sensor configured to sense bearing sump lubricant exit temperature and supply the temperature signal to the controller.

* * * * *